Dec. 26, 1939. D. TEATINI 2,184,570
PURIFICATION OF SUGAR FACTORY AND REFINERY JUICES
Filed Sept. 2, 1938
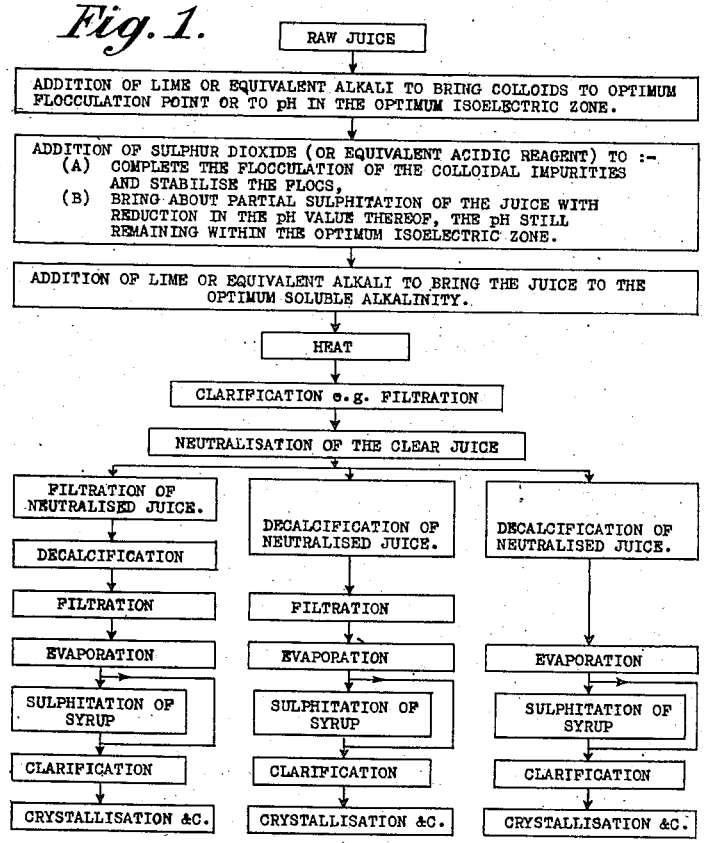
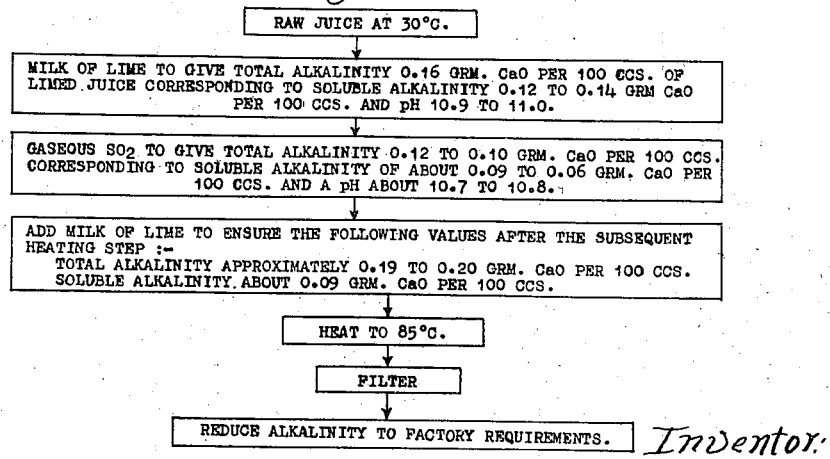

Patented Dec. 26, 1939

2,184,570

UNITED STATES PATENT OFFICE 2,184,570

PURIFICATION OF SUGAR FACTORY AND REFINERY JUICES

Dario Teatini, Hougaerde, Belgium

Application September 2, 1938, Serial No. 228,241
In Great Britain September 3, 1937

7 Claims.  (Cl. 127—50)

This invention is for improvements in the purification of sugar factory and refinery juices.

In my prior United States patent specification No. 2,071,776, there is described a process for the purification of sugar juices in the alkaline range which comprises adding alkali, and, if required for the flocculation of the colloids, an acid electrolyte in regulated and predetermined amounts sufficient to bring the juice to the optimum isoelectric point of the colloidal constituents of the juice and adjusting the soluble alkalinity of the juice, without substantial variation of the pH value thereof, to bring the soluble alkalinity to a value which is an optimum for the removal of the flocs from the liquid, heating the juice to flocculating temperature and separating out the flocculated impurities. After separating the flocculated impurities the juices are treated with sulphur dioxide or carbon dioxide or other acidic substance which will not form toxic products in order to reduce the alkalinity of the juices to factory requirements. By the foregoing process defecation of the juices by the further addition of lime is dispensed with.

In a modification of the above process also described in my prior United States patent specification No. 2,071,776 a process for the purification of sugar juice comprises adding alkali and acid electrolytes in amounts predetermined by test to bring the juice to the optimum isoelectric point in the alkaline range and adding an amount of alkali in excess of the minimum necessary to bring the juice to the optimum isoelectric point and insufficient to alter the pH of the juice to such an extent as to affect the state of aggregation of the colloidal impurities but sufficient to confer on the juice the soluble alkalinity which is an optimum for the removal of the flocculated colloids, heating the mixture to the flocculating temperature, filtering and thereafter adding acid electrolyte to reduce the alkalinity of the juice to factory requirements.

It is an object of the present invention to provide a process for the purification of sugar juices in the alkaline range by the flocculation and removal of colloidal impurities therein by the addition of lime or equivalent alkali and sulphur dioxide or equivalent acidic reagent.

It is a further object of the invention to improve still further the conditions under which sugar factory or refinery juices are purified and in particular the conditions under which removal of the flocculated colloidal impurities by filtration or the like is carried out.

I have now found that the objects set out above may be attained and a greatly increased rate of filtration of the flocculated impurities brought about by adding lime or equivalent alkali to sugar juice in such amount that the juice is brought to a point in the optimum flocculation zone of the colloidal impurities in the alkaline range and then adding sulphur dioxide or equivalent acidic reagent under such conditions that a reduction in pH takes place while still maintaining the pH within the optimum flocculation zone above referred to.

The present invention accordingly comprises a process for the purification of sugar factory or refinery juices which comprises adding lime or equivalent alkali to the juice in amount sufficient to bring the said juice to the point of optimum pH or point of optimum flocculation within the isoelectric zone in the alkaline range of the colloidal impurities to be flocculated, adding sulphur dioxide or equivalent acidic reagent rapidly so as to bring about a reduction in pH of the juice while still maintaining the pH within the isoelectric zone or optimum flocculation zone and then adding lime or equivalent alkali in such amount as to confer on the juice that soluble alkalinity at which removal of the flocculated impurities from the liquid is an optimum.

The sulphur dioxide or like acidic reagent as employed in the present invention has a twofold function. In the first place it completes and stabilises the flocculation of the colloidal impurities of the sugar juice and in the second place it reacts chemically with a portion of the alkaline medium present with consequent reduction of the pH and the alkalinity of the juice. The expression "sulphur dioxide or like reagent" includes sulphur dioxide and carbon dioxide and those substances which under the conditions employed are capable of giving rise to a high instantaneous concentration of those ions ($SO_2$, $SO_3$, $SO_4$, $CO_2$, $CO_3$, $PO_3$, $P_2O_5$) which by virtue of their negative charge are able to neutralise the positive charge carried by those colloids not already flocculated by the alkaline ions. As an example of certain materials which may be used to furnish the ions mentioned above, $SO_3$ ions may be formed by use of sulphur dioxide which under certain circumstances form a hydrated complex with water; $SO_4$ ions may be derived from dilute sulphuric acid; $CO_3$ ions are furnished by carbon dioxide by formation of one of its hydrated complexes with water and $P_2O_5$ ions may be derived from phosphorus pentoxide.

As it is an essential feature of the present invention that the sulphur dioxide or equivalent reagent should act both electrolytically and as a chemical reagent (in the case of sulphur dioxide with the formation of a sulphite) it is necessary that the concentration of and rate of addition of such reagent should be controlled so as to achieve this two-fold effect. Thus, when the acidic reagent is sulphur dioxide, the pressure at which the reagent is introduced into the juice must be so chosen and maintained that it is not so high that the action is completely or substantially completely electrolytic (as in my prior United States patent specification No. 2,071,776) and not so low that the action is exclusively chemical (as in the normal processes of sulphitation commonly employed in the art of sugar purification).

The sulphur dioxide or equivalent reagent, which may be either in the liquid or in the gaseous form, has a catalytic, stabilising or like effect on the flocculation of the colloidal impurities and not only accelerates the formation of the aggregates but also stabilizes these aggregates while bringing about a reduction in the pH of the juice. The effect of the second addition of lime or equivalent alkali is mainly to impart to the medium that alkalinity which is an optimum for clarification, e. g. by centrifuging, filtration or decantation or by decantation and filtering of the muds formed by the flocculation of the colloidal impurities, i. e. by thickening followed by filtration of the muds.

The amount by which the pH value of the juice is reduced by the addition of $SO_2$ or equivalent reagent must not be so great as to take the pH out of the iso-electric zone. This optimum iso-electric zone normally lies between pH values 10.6 to 12 in the case of raw juice from beets. In the case of cane juice the isoelectric zone of the coloidal impurities to be flocculated similarly lies in the alkaline range.

For ready reference and to facilitate understanding of the invention, attention is directed to the accompanying drawing.

The drawing shows in Figure 1 a flow sheet of the sequence of operations to which the sugar juice is subjected in flocculating the colloidal impurities it contains and in removing those flocculated impurities from the juice. It will be noticed that after the neutralisation of the clear juice any one of three alternative schemes may be adopted. Thus, the clear juice may be neutralised and filtered, the filtration being followed by decalcification, filtration, evaporation, sulphitation of syrup, clarification and so on following the normal factory procedure to crystallisation. In the second alternative, the cloudy juice after neutralisation may be decalcified and this may be followed by filtration, evaporation and thence as in Scheme 1 by sulphitation of syrup, clarification and crystallisation. In the third alternative the cloudy neutralised juice is decalcified and this is followed by evaporation, sulphitation of the syrup, clarification and crystallisation and so on as in Scheme 1. Each of the three modifications may further be modified by omitting the sulphitation of the syrup and this has been indicated in Figure 1. Heating steps may be introduced in the scheme according to the particular method of working adopted in any particular factory. It will be clear that Schemes 2 and 3 differ from Scheme 1 by the omission of the filtration of the neutralised juice while Scheme 3 further differs from Scheme 2 by the omission of the filtration of the decalcified juice.

Figure 2 indicates a sequence of operations similar to that shown in Figure 1 but sets out the particular values of temperature, alkalinity and pH referred to in the example which follows. It should be noted that the sequence of operations is not taken beyond the point at which the alkalinity of the juice is reduced to factory requirements, i. e. to the stage of Figure 1 at which the alternative processes commence.

At this point it will be convenient to insert certain definitions of terms previously used in the specification.

The expression "factory requirements" means that degree of alkalinity which the particular factory employs for the subsequent processes of decolorisation, clarification, evaporation and final crystallisation and depends upon (a) the type of final product required, (b) the design of the factory equipment, and (c) the judgment of the operator, and the expression "flocculating temperature" means that temperature at which the floccules are rendered stable and the colloids are dehydrated, and in general lies between 80° C. and 95° C. for beet sugar juice.

The expression "lime or equivalent alkali" comprises the corresponding oxides and hydroxides of the alkalis or alkaline earths, or the carbonates of the alkalis, or mixtures thereof.

By the expression "optimum isoelectric point" is meant those conditions of pH and alkalinity under which the total amount of colloidal impurities flocculated is a maximum, i. e. the conditions under which a maximum amount of the colloidal impurities has been brought to their isoelectric points, or to the threshold thereof. Such conditions of pH and alkalinity may be determined for example by means of a simple series of tests.

The expression "isoelectric zone" refers to those points of pH lying in the immediate neighbourhood of the optimum isoelectric point as above defined.

The term "soluble alkalinity" means the percentage of lime or equivalent dissolved in the liquid and is determined by titration of the filtered solution. The term "total alkalinity" means the percentage of both dissolved and suspended lime in the liquid, and is determined by titration of the unfiltered liquid.

It may be noted that pH value is a measure of the hydrogen ion concentration of the juice, i. e. a measure of the concentration of dissociated substances in solution. This bears no direct relation to the alkalinity or acidity of the juice as obtained by titration, which only indicates the ability of the solution to neutralise acid or alkali. For example, the total alkalinity of limed sugar juice, as measured by the usual chemical tests, depends upon the total amount of dissolved and suspended lime therein, whereas the pH value increases only as the added lime dissociates. Further, as lime is added, the rate of dissociation decreases and a point is reached at which the pH value practically ceases to rise while additions of lime continue to increase the total alkalinity so far as the lime is added.

It will be appreciated that in the present invention as in that described in my United States patent specification No. 2,071,776 the amounts of lime or equivalent alkali and of $SO_2$ or equivalent acidic reagent to be added to the sugar juices are determined by carrying out a simple series of tests and the nature of such series of tests substantially as set out in the above-mentioned United States patent specification.

The term "decalcification" is used to connote the removal of residual lime (i. e. dissolved lime)

or other alkaline substance which has been added to the juice for the purpose of bringing its pH to the value required for removal of the colloidal impurities and which unless removed would cause difficulty in the subsequent treatment of the juices by processes of decolorisation, clarification, concentration and crystallisation. This process of decalcification comprises the addition to the sugar juice of a substance which will by a process of double decomposition replace the acid radicle of soluble calcium salts present in the juice with the formation upon subsequent heating of an insoluble calcium product and at the same time of a soluble non-toxic substance which will not interfere with the subsequent purification of the sugar juice, e. g. by formation of a precipitate in the processes of concentration or crystallisation.

Such a decalcifying agent may consist e. g. of sodium carbonate, a soluble phosphate or phosphoric acid which will react with calcium sulphite or other soluble calcium salt present in the sugar juices and form by double decomposition a precipitate of calcium carbonate or phosphate and an innocuous solution of a sulphite which does not interfere with the subsequent processes of concentration and crystallisation but passes into the molasses. The precipitate of calcium carbonate or phosphate may be removed by any convenient means.

Following is a description by way of example only of one method of carrying the invention into effect.

Example

Raw juice obtained from sugar beet is treated at a temperature of approximately 30° C. with such an amount of milk of lime as to confer on the juice a total alkalinity (to phenolphthalein) of 0.16 gram CaO per 100 ccs. of limed juice. This corresponds to a soluble alkalinity of approximately 0.12 to 0.14 gram CaO per 100 ccs. and a pH of approximately 10.9 to 11.

It is found that if the juice is treated under the conditions of alkalinity and temperature described above rapid flocculation of the colloidal impurities is brought about and the aggregates formed are of such a nature that they are immune to redispersion upon the subsequent introduction of $SO_2$.

Gaseous $SO_2$ under a pressure of approximately 10 lbs. per square inch (i. e. a pressure at which the $SO_2$ acts partly electrolytically and partly chemically) is then rapidly introduced into the juice until the total alkalinity falls to 0.12 to 0.10 gram CaO per 100 ccs. This normally corresponds to a soluble alkalinity of about 0.09 to 0.06 gram CaO per 100 ccs. and a pH equal to about 10.7 to 10.8, i. e. a pH materially lower than the pH after treatment with lime. Milk of lime is then added to the juice in such an amount as to raise the total alkalinity (to phenolphthalein) determined after the juice has been heated to about 85° C. to approximately 0.19 to 0.20 gram CaO per 100 ccs. and the soluble alkalinity to about 0.09 gram CaO per 100 ccs.

It is found that if the temperature of the juice is, for example, 30° C. when the soluble alkalinity of 0.12 to 0.14 gram CaO per 100 ccs. is reached, flocculation of the colloidal impurities is brought about rapidly and completely and the aggregates are stabilised against redispersion by the subsequent introduction of the $SO_2$. Any rise in temperature of the $SO_2$ between its source and its point of introduction into the juice will affect the pressure of the gas and must thus be taken into account.

Complete flocculation and removal of colloidal impurities can be shown to have been brought about by the absence of precipitate or turbidity when lime or saccharate of lime is added to a sample of the filtered juice.

After carrying out the treatment with lime and sulphur dioxide described above the juice is heated to 85° C., filtered and the alkalinity then reduced to factory requirements for subsequent operations.

If the flocculation is carried out at a relatively low temperature, for example 10° C., the time taken for the completion of flocculation will be increased.

It will be understood that the amount of lime added following the introduction of $SO_2$ is that necessary for maintaining the optimum flocculating, stabilising and filtering conditions attained by the preceding addition of lime and $SO_2$ and for taking part in certain chemical reactions which take place when the temperature of the juice is raised to say 85° C. Such reactions include those occurring between the organic impurities and the organic compounds of calcium with free lime.

The soluble alkalinity at 85° C. may vary between 0.07 and 0.14 gram CaO per 100 ccs. without, however, adversely affecting the purity, lime content or speed of filtration of the treated juice. This variation is rendered possible owing to the effectiveness of stabilisation of the impurities flocculated by lime and $SO_2$.

In the example described above a temperature of 30°C. is specified but it will be understood that if any other temperature is employed the amount of lime selected will have to be varied accordingly. An alteration in temperature would, of course, affect both the amount of lime added before the sulphur dioxide and the amount of lime added after but it would not substantially alter the total amount of lime to be employed before and after the addition of $SO_2$.

It will be clear that the soluble alkalinity and the pH values are of primary importance in attaining the optimum conditions for the treatment of the juices and it will further be clear that the total alkalinity depends not only on the temperature at which the purification is carried out but upon the characteristics of the raw juice including the initial acidity of the juice and the nature and quantities of the non-sugar constituents.

It has been found that by use of the present invention the rate of removal of flocculated impurities from sugar juice by filtration, decantation, centrifuging or the like may be greatly increased and may in certain cases be up to five times that of processes hitherto employed.

In the present invention defecation of the juices by the addition of further lime after removal of the flocculated impurities, and carbonatation may be dispensed with.

I claim:

1. A process for the purification of sugar juices which comprises adding lime or equivalent alkali to the juice in amount sufficient to bring the said juice to the point of optimum pH within the isoelectric zone in the alkaline range of the colloidal impurities to be flocculated, adding sulphur dioxide or equivalent acidic reagent so as to bring about a reduction in pH value of the juice while still maintaining the pH value within the said isoelectric zone and then adding lime or equivalent alkali to the juice in such amount as to confer on the juice that soluble alkalinity at which the removal of the flocculated impurities from the liquid takes place most rapidly.

2. A process for the purification of sugar juices which comprises adding lime or equivalent alkali to the juice in amount sufficient to bring the said juice to the point of optimum pH value within the isoelectric zone in the alkaline range of the colloidal impurities to be flocculated, adding an acidic reagent in such amount and under such conditions that it is capable of acting electrolytically as well as chemically so as to bring about a reduction in pH value of the juice while still maintaining the pH within the said isoelectric zone and then adding lime or equivalent alkali to the juice in such amount as to confer on the juice that soluble alkalinity at which the removal of the flocculated impurities from the liquid takes place most rapidly.

3. A process for the purification of beet sugar juices which comprises heating the raw juice, adding lime or equivalent alkali to the hot juice in amount sufficient to give a total alkalinity of the order of 0.16 gram CaO per 100 ccs. of juice, a soluble alkalinity of 0.12 to 0.14 gram CaO per 100 ccs. of juice and a pH value between 10.9 and 11.0, adding sulphur dioxide or equivalent gaseous acidic reagent so as to bring about a reduction in pH value of the juice while still maintaining the pH value within the isoelectric zone of the colloidal impurities to be flocculated and then adding lime or equivalent alkali to the juice in such amount as to confer on the juice that soluble alkalinity at which the removal of the flocculated impurities from the liquid takes place most rapidly.

4. A process as claimed in claim 3 wherein the acidic reagent is sulphur dioxide and its amount is such as to reduce the total alkalinity of the juice to 0.12 to 0.10 gram CaO per 100 ccs. of juice, the soluble alkalinity to 0.09 to 0.06 gram CaO per 100 ccs. of juice and the pH to about 10.7 to 10.8.

5. A process as claimed in claim 3 wherein after the addition of the gaseous acidic reagent milk of lime is added in such amount as to raise the total alkalinity to the order of 0.19 to 0.20 gram CaO per 100 ccs. and the soluble alkalinity to the order of 0.09 gram CaO per 100 ccs.

6. A process for the purification of beet sugar juices which comprises heating the raw juice, adding lime or equivalent alkali to the juice in amount such that the total alkalinity of the juice is 0.16 gram CaO per 100 ccs., the soluble alkalinity 0.12 to 0.14 gram CaO per 100 ccs. and the pH 10.9 to 11.0, adding sulphur dioxide in gaseous form in such amount as to confer on the juice a total alkalinity of 0.12 to 0.19 gram CaO per 100 ccs., a soluble alkalinity of 0.09 to 0.06 gram CaO per 100 ccs. and a pH of 10.7 to 10.8, adding milk of lime to raise the total alkalinity to 0.19 to 0.20 gram CaO per 100 ccs. and the soluble alkalinity to 0.09 gram CaO per 100 ccs., heating the juice to a temperature of the order of 85° C. and removing the flocculated impurities.

7. A process for the purification of sugar juices which comprises adding lime or equivalent alkali to the juice in amount sufficient to bring the said juice to the point of optimum pH within the isoelectric zone in the alkaline range of the colloidal impurities to be flocculated, adding sulphur dioxide or equivalent acidic reagent so as to bring about a reduction in the pH of the juice while still maintaining the pH within the said isoelectric zone, adding lime or equivalent alkali to the juice in such amount as to confer on the juice that soluble alkalinity at which the removal of the flocculated impurities from the liquid takes place most rapidly, heating the juice to a temperature of the order of 85°C., removing the flocculated impurities from the juice, neutralising and filtering the juice and removing excess lime therefrom by decalcification.

DARIO TEATINI.